(12) United States Patent
DeWitt

(10) Patent No.: US 6,209,906 B1
(45) Date of Patent: Apr. 3, 2001

(54) COVER FOR A VEHICLE AIRBAG ASSEMBLY

(75) Inventor: William L. DeWitt, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/305,698

(22) Filed: May 5, 1999

(51) Int. Cl.[7] .......................... B60R 21/20; B60R 21/16
(52) U.S. Cl. .................................... 280/728.3; 280/728.2; 280/732
(58) Field of Search .......................... 280/728.2, 728.3, 280/732

(56) References Cited

U.S. PATENT DOCUMENTS 5,639,116 * 6/1997 Shimizu et al. .................. 280/728.3
5,851,023 * 12/1998 Nagata et al. .................... 280/728.2
5,904,367 * 5/1999 Warnez et al. .................... 280/728.3

* cited by examiner

Primary Examiner—Brian L. Johnson
Assistant Examiner—Matthew Luby
(74) Attorney, Agent, or Firm—Lawrence J. Shurupoff

(57) ABSTRACT

A vehicle safe airbag, assembly includes a cover for an airbag canister formed separately from the instrument panel, to reduce the overall manufacturing expense. The cover is affixed in part by a snap fit to an airbag canister so as to extend through an enlarged opening in the instrument panel, to present an appearance as an embossed section of the instrument panel. In one embodiment of the invention the cover extends laterally beyond the airbag canister to overlie an air conditioner duct located alongside the canister.

4 Claims, 3 Drawing Sheets

COVER FOR A VEHICLE AIRBAG ASSEMBLY

CROSS REFERENCE TO A RELATED PATENT APPLICATION

This patent application is related to my co-pending U.S. patent application, Ser. No. 09/252,256 filed on Feb. 18, 1999 and entitled "Vehicle Airbag Assembly."

BACKGROUND OF THE INVENTION

This invention relates to a safety airbag assembly for an automotive vehicle, and particularly to a passenger side airbag assembly that includes a cover formed separately from the associated instrument panel. In preferred practice of the invention the cover conceals an airbag canister and an air conditioner duct extending alongside the canister. An opening in the cover is operable to direct conditioned air from the duct into the passenger compartment.

SUMMARY OF THE INVENTION

In many automotive vehicles the passenger side airbag canister is concealed behind an instrument panel that has hidden score lines or perforations configured to outline an openable door in alignment with the airbag canister. When the airbag is deployed the instrument panel is ruptured along the scored lines, whereby the door is opened to permit the inflated airbag to expand through the door opening into the passenger compartment.

The present invention relates to a simplified door construction for an airbag canister, wherein the door is formed separately from the instrument panel. The separately formed door is hingedly attached to a hidden airbag canister for disposition within an enlarged opening in the instrument panel. In preferred practice of the invention the door or cover protrudes slightly beyond the plane of the instrument panel so as to have an embossed appearance when viewed by a passenger sitting in facing relation to the instrument panel.

The cover is designed to span the airbag canister and an air conditioning duct located alongside the canister. A relatively small louvered opening in the cover is aligned with the air conditioning duct for conveying conditioned air into the passenger compartment. During deployment of the airbag, e.g. in a vehicle collision, the cover swings to the open position without disturbing the air conditioning duct.

The cover arrangement of the present invention is similar to the cover arrangement depicted in my co-pending patent application Ser. No. 09/252,256, except that in the present invention the cover is mounted to an airbag canister located within the instrument panel. In co-pending patent application Ser. No. 09/252,056 the cover is shown mounted to a hidden frame structure within the instrument panel.

Specific features of the invention will be apparent from the attached drawings and description of an illustrative embodiment of the invention.

BRIEF DESCRIPTION OF THE DRAWINGS

FIG. 5 is taken in the direction of arrow 5 in FIG. 2.

DESCRIPTION OF A PREFERRED EMBODIMENT OF THE INVENTION

The drawings fragmentarily show the passenger side of an automotive vehicle instrument panel 10 constructed according to the invention. Panel 10 includes an upper shelf portion 12 and a downwardly extending frontal portion 14 facing the passenger seat, not shown. End edge 16 of the instrument panel is located in near proximity to the front door on the passenger side of the vehicle. The driver side of the instrument panel is not visible in FIG. 1.

Figure 1:
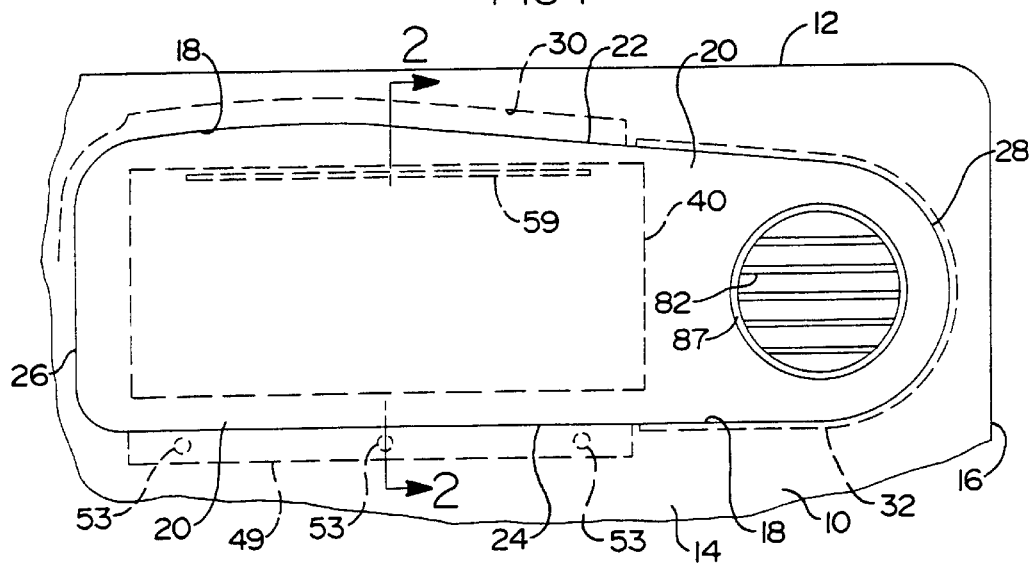
FIG. 1 is a fragmentary front elevation view of an instrument panel having a passenger side airbag assembly of the present invention installed therein.

Instrument panel 10 has a relatively large opening 18 that accommodates a cover 20 for an airbag assembly on the passenger side of the vehicle. As shown in FIG. 1, cover 20 has an upper edge 22, a lower edge 24, a left edge 26, and a right edge 28. As depicted in FIG. 1, edge 28 has a semi-circular configuration that gives the cover a unique ornamental appearance. However edge 28 could be a linear edge (similar to edge 26) if so desired. The cover has a close tolerance disposition relative to the associated edges of panel opening 18, such that the person views the cover as part of the instrument panel. In fact, cover 20 is entirely separate from the instrument panel.

Figure 6:
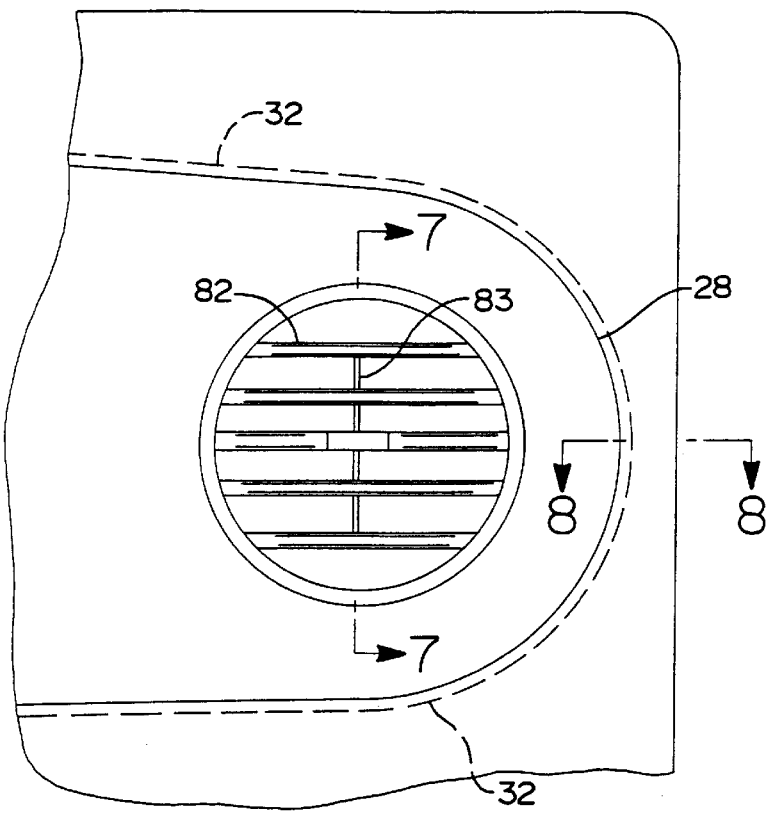
FIG. 6 is an enlarged fragmentary view taken in the same direction as FIG. 1, to show features not apparent from FIG. 1.
Figure 7:
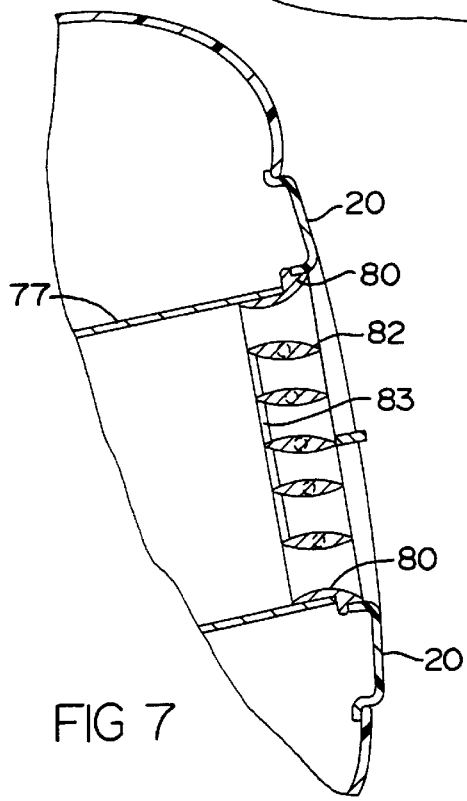
FIG. 7 is a sectional view taken on line 7—7 in FIG. 6.

Cover 20 has a flange 30 extending upwardly from its upper edge so as to be concealed behind an edge area of instrument panel 10 defined by panel opening 18. A second flange 32 (FIGS. 6 and 8) extends from cover 20 along semi-circular edge 28 and portions of the upper and lower edges 22 and 24 of the cover. The principal purpose of flange 32 is to make the crack along the cover edge less noticeable. Edge 28 is located in a concealed position behind the instrument panel 10 to prevent light transmission through the crack formed between the cover edge and the edge of panel opening 18. During air bag deployment, flange 32 deforms to pass through panel opening 18.

Figure 8:
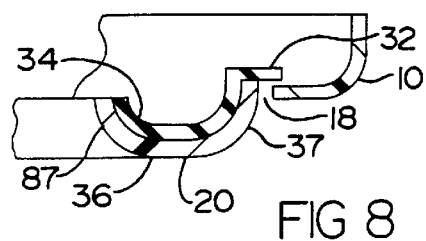
FIG. 8 is an enlarged fragmentary sectional view taken on line 8—8 in FIG. 6.

In preferred practice of the invention, cover 20 is a molded plastic structure having an elastomeric lining 34 extending along its concealed surface. FIG. 8 shows the molded plastic wall 36 and the associated elastomeric lining 34 bonded to the concealed surface of the plastic wall. Wall 36 is molded to form a high strength curvilinear rim 37 around the edge of cover 20. The elastomeric lining 34 extends beyond rim 37 to form flange 32.

As will be seen in FIG. 8, flange 32 acts as a light barrier to minimize the size of the crack formed between peripheral rim 37 and the edge of the associated opening in panel 10. Cover 20 protrudes through the panel opening 18 so as to present an embossed appearance to a person sitting in the front passenger seat of the vehicle. Cover 20 is formed separately from the instrument panel, but nevertheless presents the appearance of being an integral part of the instrument panel.

Typically, the plastic wall 36 of the cover is molded separately from the elastomeric lining 34. The plastic wall structure 36 can then be disposed as an insert in the mold used to form lining 34.

Figure 2:
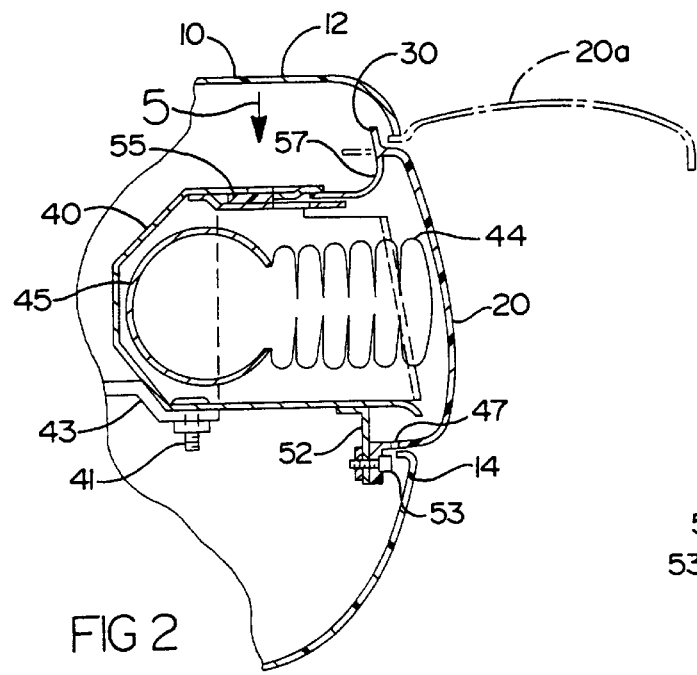
FIG. 2 is a transverse sectional view taken on line 2—2 in FIG. 1.

An airbag canister 40 is mounted in a concealed position within the instrument panel 10 in alignment with cover 20. As shown in FIG. 2, the airbag canister has two or more studs 41 for affixing the canister to a stationary bracket 43. The canister includes a pressurized gas source that communicates with a folded air bag, whereby when an electrical signal is delivered to a squib in the airbag housing 45, the pressurized gas is generated by thermal chemical reaction, thus inflating the airbag in known fashion.

The pressure created on cover 20 by the inflating airbag causes the cover to move to the open position denoted by numeral 20a in FIG. 2, thereby allowing the airbag to deploy into the passenger space.

As shown in FIG. 2, the upper edge of cover 20 is hinged to airbag canister 40, to permit the cover 20 to swing upwardly during airbag deployment. The lower edge of the cover has a tearable connection with the airbag canister that enables the lower edge of the cover to separate from the canister during airbag deployment. Preferably, the tearable connection includes a number of slots 47 formed in an elastomeric flange 49 extending from the lower edge of cover 20.

Figure 9:
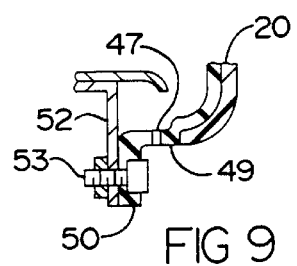
FIG. 9 is a fragmentary enlarged sectional view through a structural detail appearing in FIG. 2.

As shown in FIG. 9, flange 49 has a thickened section 50 seating against an angle bracket 52 depending from the bottom wall of the airbag canister 40. Plural bolts 53 extend through section 50 of flange 49 and bracket 52 to attach flange 49 to the bracket. Slots 47 are formed in a relatively thin section of the elastomeric flange, such that when the airbag is inflated the lower edge of cover 20 is torn away from canister 40 along a tear line defined by slots 47.

Figure 3:
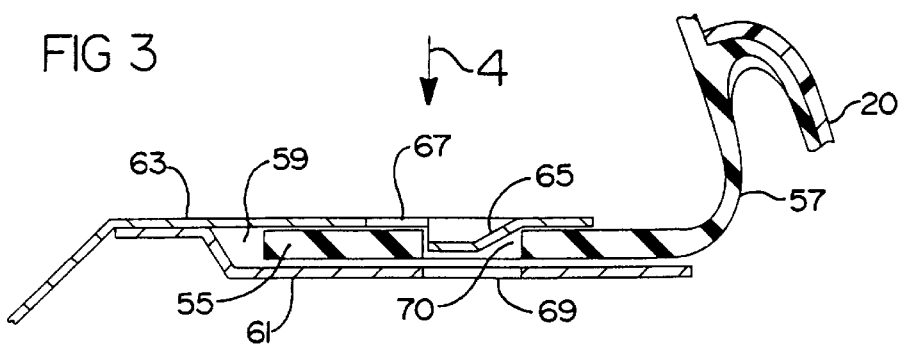
FIG. 3 is a fragmentary view taken on an enlarged scale through a structural detail shown in FIG. 2.
Figure 4:
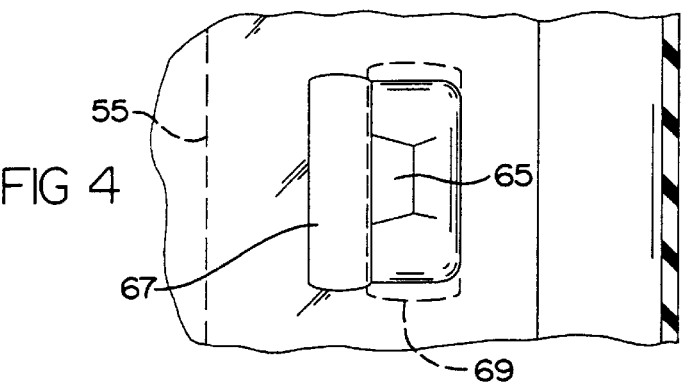
FIG. 4 is a plan view of the FIG. 3 construction taken in the direction of arrow 4 in FIG. 3.

FIGS. 3 and 4 show some features of the hinge that connects the upper edge of cover 20 to airbag canister 40. The cover has a resilient plastic or elastomeric flap 55 extending horizontally from a relatively thin curved connector wall 57 into a horizontal slot 59 in the roof of the airbag canister. Slot 59 and flap 55 extend transversely a substantial percentage of the canister 40 width dimension, so that flap 55 provides a high strength anchorage for cover 20. Curved connector wall 57 forms a living hinge.

Slot 59 is formed by an internal partition 61 spaced below roof wall 63 of the airbag canister. Wall 63 is deformed downwardly at three points to form three lugs 65. Also, an area bordering each lug is punched out to form a rectangular clearance opening 67. Partition 61 is punched out in the area directly below each lug 65, to form an enlarged opening 69. The transverse length of each opening 69 is slightly greater than the corresponding dimension of each lug 65, as indicated by the dashed lines in FIG. 4.

Flap 55 has three openings 70 sized to fit onto lugs 65. When flap 55 is inserted manually into slot 59, the openings 70 snap onto lugs 65 to retain flap 55 in an essentially fixed position in slot 59. During the insertional motion of flap 55 into slot 59 the flap material deforms slightly into the openings 69 in order to pass across lugs 65. Lugs 65 do not significantly deform or deflect, but remain essentially rigid during insertional motion of elastomeric flap 55.

Figure 5:
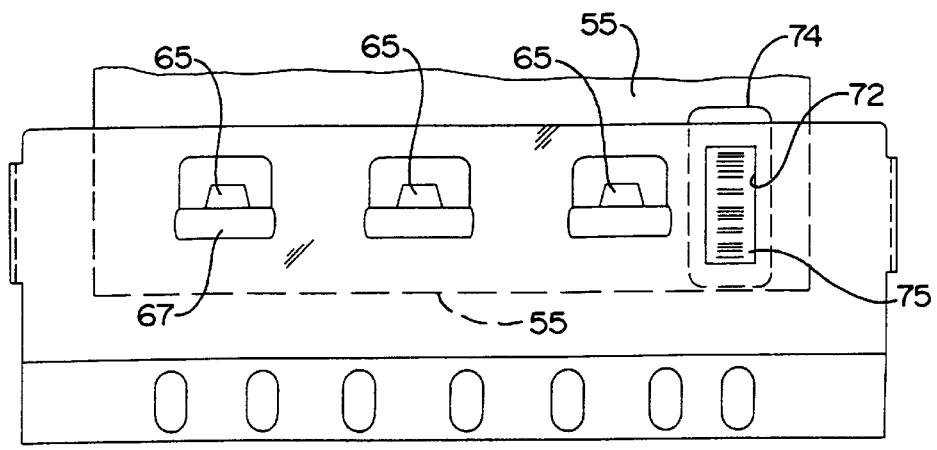
FIG. 5 is a fragmentary top plan view of an airbag canister shown in FIG. 2.

As shown in FIG. 5, roof wall 63 of the airbag canister has a rectangular window (opening) 72. Elastomeric flap 55 has an upwardly facing label 74 that is printed with a distinctive bar code 75. When the flap is properly installed into slot 59 the bar code is visible through window 72. Should the flap not be fully seated in slot 59, the bar code will not be completely visible through window 72.

Cover 20 is installed on the airbag canister 40 after the canister has been mounted on bracket 43 (FIG. 2), but before installation of the instrument panel over the cover. The person installing cover 20 on canister 40 will have access to window 72 so that proper assembly of the cover to the canister can be verified. The person performing the installation, or a checker, can operate a portable bar code scanner to verify the installation accuracy. If the cover is not properly installed, the bar code can not be read. This will provide an indication that the cover installation should be checked for proper assembly.

As an alternative to the bar code, other distinctive markings can be employed on label 74, e.g. a distinctive color or color combination sized to fully occupy window 72.

The cover shown in FIG. 1 extends laterally beyond airbag canister 40 to extend in front of an air conditioner duct 77. The cover spans both airbag canister and the air conditioner duct to enhance the appearance of the cover as being an integral part of the instrument panel. The duct is affixed to a suitable support in the space behind cover 20. The duct includes a circular shroud 80 that extends through a circular opening 87 in cover 20. A louver assembly 82 is mounted in shroud 80 for controlling the flow of conditioned air into the passenger compartment.

The louver assembly can include an array of pivotal louvers linked together by a tie rod 83 whereby the louvers can be pivoted in unison around the midplane of shroud 80 to vary the air flow rate and direction.

There is a slight clearance between shroud 80 and the edge of opening 87 in cover 20, so that when the airbag is deployed cover 20 swings upwardly around hinge connection 57 (FIG. 2) without disturbing the louver assembly.

An important feature of the invention is that cover 20 protrudes a slight distance beyond the plane of instrument panel surface 14, as shown in FIG. 1, such that the cover has an embossed appearance. The cover appears to be in integral part of the instrument panel, however, in fact, the cover is a separate low cost molding designed to reduce the overall cost of incorporating the passenger airbag into the instrument panel.

In preferred practice of the invention, cover 20 is a plastic molding having an elastomeric lining that extends beyond the cover edge to form flange 28 and integral attachment structures 49 and 55. The elastomeric lining contributes some sound deadening features to the cover, while offering some simplification in the cover attachment function.

What is claimed is:

1. A passenger side airbag assembly that includes:

an instrument panel having a first relatively large opening therein; an air conditioning duct located within said instrument panel, said duct having an air discharge end disposed in said instrument panel opening;

an air bag canister located within the instrument panel alongside said air conditioning duct; and an airbag cover located within said instrument panel opening; said cover having a second relatively small opening aligned with said air conditioning duct; said cover spanning the air bag canister and the air conditioning duct, whereby deployment of the airbag forces the cover to move around the hinged connection to an open position without disturbing the air conditioning duct;

said canister having a roof wall (63) and an internal partition (61) spaced below said roof wall to from a slot along the roof wall undersurface; said cover having an integral flap extending into said slot to connect the cover to the canister; said flap having a flexible section located outside the slot to form a living hinge that enables the cover to swing upwardly during airbag deployment;

said roof wall having plural areas thereof deformed downwardly to define lugs within said slot; said flap having plural detent openings therein registerable with said lugs when the flap is inserted into said slot; said roof wall having an inspection window therein; said flap having a distinctive marking thereon viewable through said window when the flap is inserted into the slot to a position wherein said detent openings are lockably engaged with said lugs.

2. The airbag assembly of claim 1, wherein said distinctive marking is a bar code.

3. A passenger airbag assembly that includes:

an instrument panel having an opening therein;

an airbag canister located in a concealed position behind said panel in alignment with said opening;

an airbag cover located within said instrument panel opening to normally conceal the airbag canister; said cover having an upper edge and a lower edge;

a hinged connection between the upper edge of the cover and the airbag canister, and a tearable connection between the cover lower edge and the canister, whereby said tearable connection is required to be broken during deployment of the airbag;

said canister having a roof wall and an internal partition spaced below said roof wall to form a slot along the roof wall undersurface; said cover having an integral flap extending into said slot to connect the cover to the canister; said flap having a flexible section located outside the slot to form a living hinge that enables the cover to swing upwardly during airbag deployment;

said roof wall having plural areas thereof deformed downwardly to define lugs within said slot; said flap having plural detent openings therein registerable with said lugs when the flap is inserted into said slot; said roof wall having an inspection window therein;

said flap having a distinctive marking thereon viewable through said window when the flap is inserted into the slot to a position wherein said detent opening are lockably engaged with said lugs.

4. The airbag assembly of claim 3, wherein said distinctive marking is a bar code.

* * * * *